(12) United States Patent
Lim et al.

(10) Patent No.: US 12,304,834 B2
(45) Date of Patent: May 20, 2025

(54) POSITIVE ELECTRODE ACTIVE MATERIAL FOR LITHIUM SECONDARY BATTERY AND METHOD FOR PRODUCING THE SAME

(71) Applicant: LG Energy Solution, Ltd., Seoul (KR)

(72) Inventors: Sung Chul Lim, Daejeon (KR); Min Chul Jang, Daejeon (KR); Il Hong Kim, Daejeon (KR); In Sung Uhm, Daejeon (KR); Byoung Hyo Jung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 483 days.

(21) Appl. No.: 17/773,983

(22) PCT Filed: Nov. 12, 2020

(86) PCT No.: PCT/KR2020/015925
§ 371 (c)(1),
(2) Date: May 3, 2022

(87) PCT Pub. No.: WO2021/096265
PCT Pub. Date: May 20, 2021

(65) Prior Publication Data
US 2022/0363561 A1 Nov. 17, 2022

(30) Foreign Application Priority Data
Nov. 13, 2019 (KR) .................... 10-2019-0145386

(51) Int. Cl.
*C01G 53/42* (2025.01)
(52) U.S. Cl.
CPC .......... *C01G 53/42* (2013.01); *C01P 2002/32* (2013.01); *C01P 2006/40* (2013.01)

(58) Field of Classification Search
CPC . C01G 53/42; C01G 45/1242; C01P 2002/32; C01P 2006/40; C01P 2002/72;
(Continued)

(56) References Cited

U.S. PATENT DOCUMENTS 5,955,219 A 9/1999 Nishijima et al.
2003/0108794 A1* 6/2003 Park ............... H01M 4/525
427/126.6
(Continued)

FOREIGN PATENT DOCUMENTS

CN 1459131 A 11/2003
CN 102122714 A 7/2011
(Continued)

OTHER PUBLICATIONS

Ruther, R. et al., "Synthesis, Structure, and Electrochemical Performance of High Capacity Li2Cu0.5Ni0.5O2 Cathodes," Chemistry of Materials, Sep. 2015, pp. 6746-6754, vol. 27, American Chemical Society. (Year: 2015).*
(Continued)

*Primary Examiner* — Daniel S Gatewood
(74) *Attorney, Agent, or Firm* — Lerner David LLP

(57) ABSTRACT

A positive electrode active material includes a lithium transition metal oxide having a spinel crystal structure, and a coating layer positioned on the surface of the lithium transition metal oxide, wherein the coating layer has an orthorhombic structure, and includes an oxide represented by Formula 1. A method for producing the positive electrode active material, a positive electrode including the positive electrode active material, and a lithium secondary battery, the positive electrode active material.

13 Claims, 4 Drawing Sheets

(58) Field of Classification Search
CPC .............. C01P 2002/76; C01P 2002/77; C01P 2004/80; H01M 4/366; H01M 4/505; H01M 4/62; H01M 10/052; Y02E 60/10
See application file for complete search history.

(56) References Cited

U.S. PATENT DOCUMENTS

| | | |
|---|---|---|
| 2007/0122338 A1 | 5/2007 | Park et al. |
| 2011/0171530 A1 | 7/2011 | Esaki et al. |
| 2013/0252109 A1 | 9/2013 | Oh et al. |
| 2014/0087259 A1* | 3/2014 | Li .................. H01M 4/525 429/223 |
| 2016/0344027 A1 | 11/2016 | Asari |
| 2017/0077504 A1 | 3/2017 | Ise et al. |
| 2018/0233737 A1 | 8/2018 | Wu et al. |

FOREIGN PATENT DOCUMENTS

| | | |
|---|---|---|
| CN | 103151520 A | 6/2013 |
| CN | 103700832 A | 4/2014 |
| CN | 109565041 A | 4/2019 |
| JP | H10158017 A | 6/1998 |
| JP | 2001167766 A | 6/2001 |
| JP | 2003229126 A | 8/2003 |
| JP | 2011142059 A | 7/2011 |
| JP | 2015084273 A | 4/2015 |
| JP | 6200067 B2 | 9/2017 |
| JP | 2017168323 A * | 9/2017 |
| JP | 6570934 B2 | 9/2019 |
| JP | 2019149356 A | 9/2019 |
| KR | 100838944 B1 | 6/2008 |
| KR | 20100036896 A | 4/2010 |
| KR | 101122715 B1 | 3/2012 |
| KR | 101395846 B1 | 5/2014 |
| KR | 20190078392 A | 7/2019 |
| WO | 2013115336 A1 | 8/2013 |
| WO | 2015050031 A1 | 4/2015 |

OTHER PUBLICATIONS

Ruther, R. et al., "Synthesis, Structure, and Electrochemical Performance of High Capacity Li2Cu0.5Ni0.5O2 Cathodes," Chemistry of Materials, Sep. 2015, vol. 27, American Chemical Society, supporting information (Year: 2015).*
Extended European Search Report including Written Opinion for Application No. 20888002.1 dated Oct. 18, 2022, pp. 1-7.
Guler, M. O. et al., "Improvement of electrochemical and structural properties of LiMn2O4 spinel based electrode materials for Li-ion batteries", International Journal of Hydrogen Energy, May 10, 2014, pp. 21447-21460, vol. 39, Elsevier, Amsterdam, NL. XP029096573.
Ruther, R. E. et al., "Structural Transformations in High-Capacity Li2 Cu0.5 Ni0.5 O2 Cathodes", Chemistry of Materials, Mar. 9, 2017, pp. 2997-3005, vol. 29. XP055968739.
International Search Report for Application No. PCT/KR2020/015925 mailed Feb. 9, 2021, 2 pages.
Ruther, R. et al., "Synthesis, Structure, and Electrochemical Performance of High Capacity Li2Cu0.5Ni0.5O2 Cathodes," Chemistry of Materials, Sep. 2015, pp. 6746-6754, vol. 27, American Chemical Society.

* cited by examiner

[FIG.1]
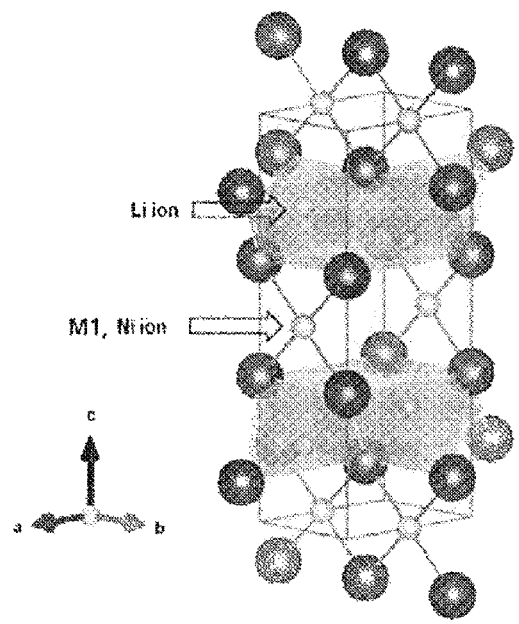
[FIG.2]
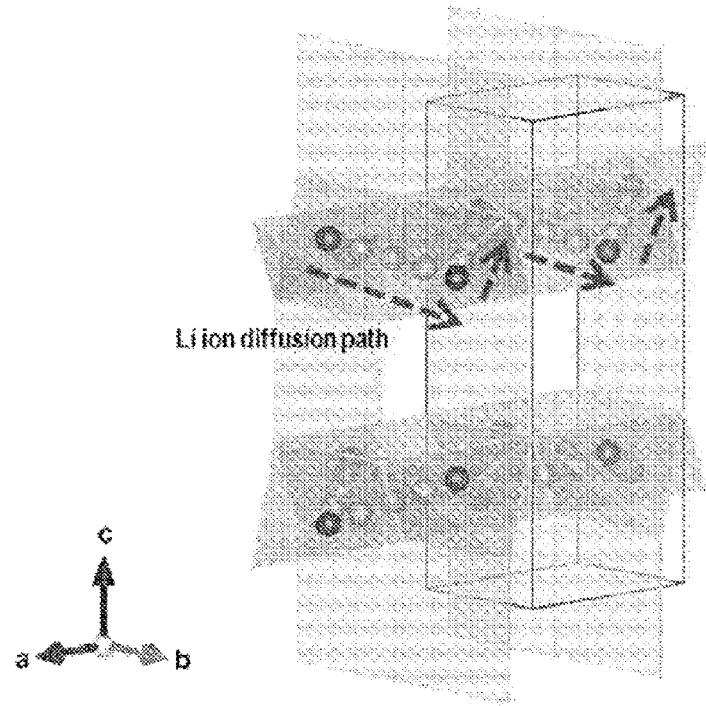

[FIG.3]
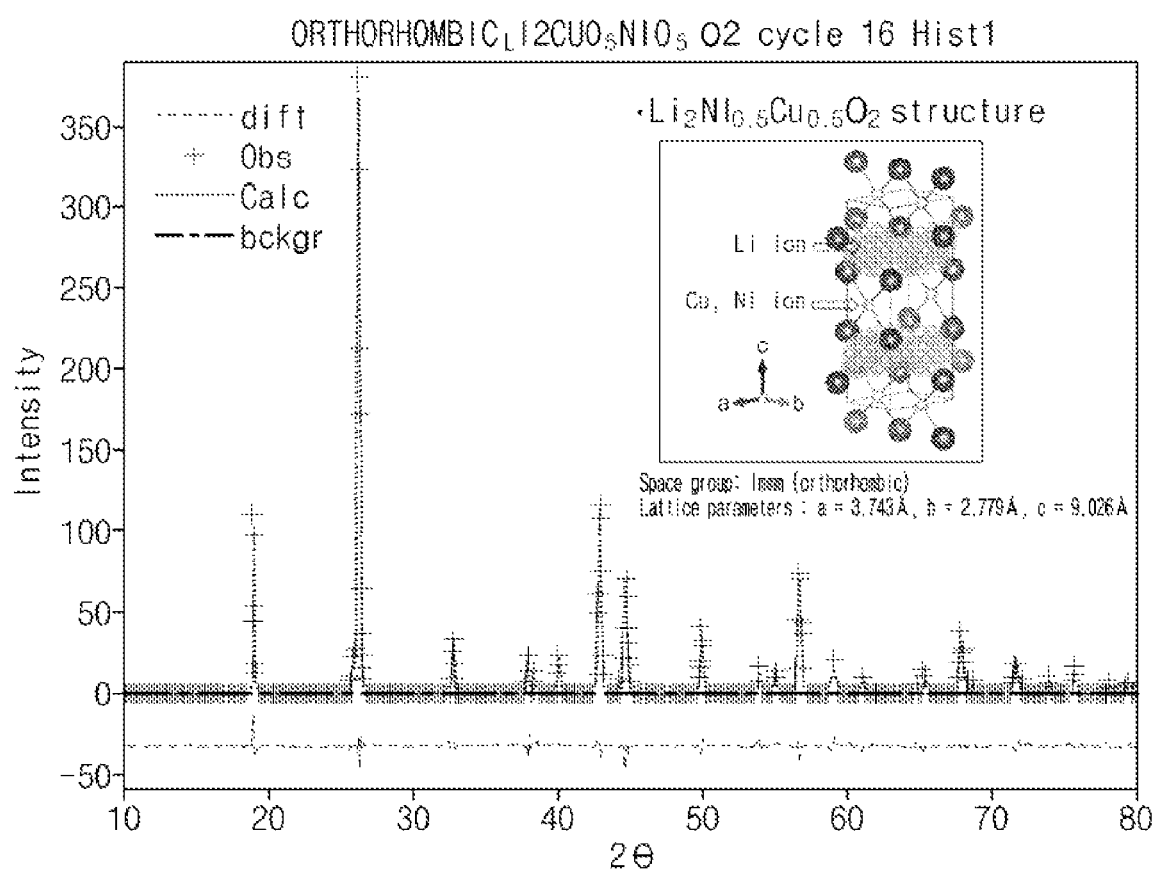

[FIG.4]
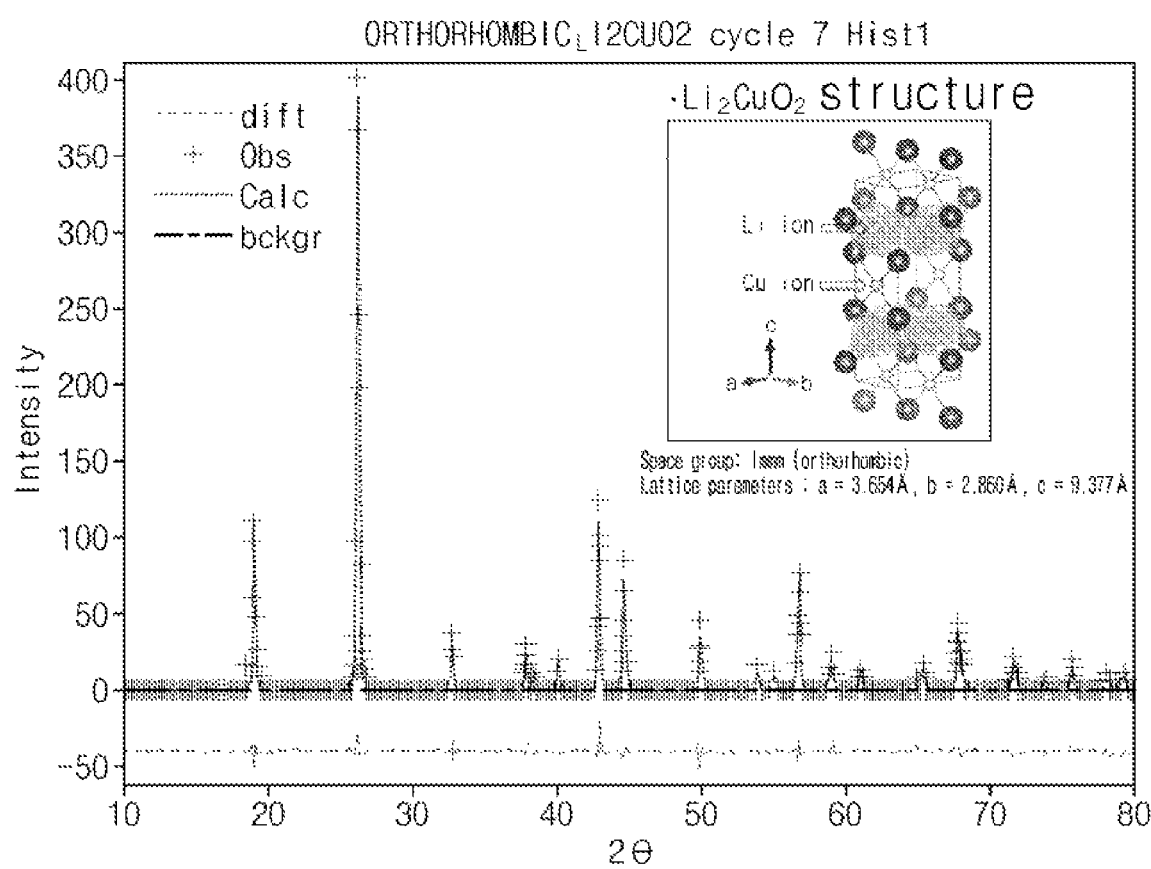

[FIG.5]
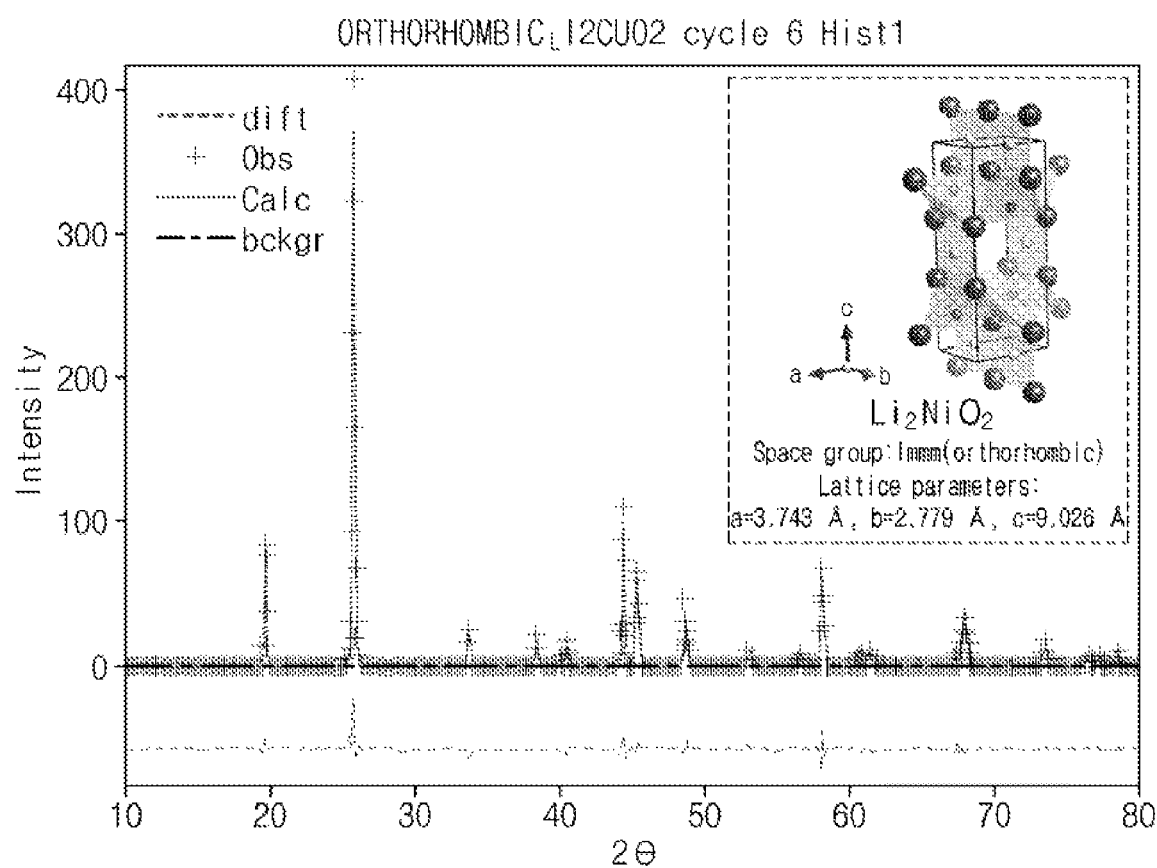

POSITIVE ELECTRODE ACTIVE MATERIAL FOR LITHIUM SECONDARY BATTERY AND METHOD FOR PRODUCING THE SAME

CROSS-REFERENCE TO RELATED APPLICATIONS

This application is a national phase entry under 35 U.S.C. § 371 of International Application No. PCT/KR2020/015925, filed on Nov. 12, 2020, which claims the benefit of Korean Patent Application No. 10-2019-0145386, filed on Nov. 13, 2019, in the Korean Intellectual Property Office, the disclosures of which are incorporated herein in its entirety by reference.

TECHNICAL FIELD

The present invention relates to a positive electrode active material for a lithium secondary battery, a method for producing the positive electrode active material, a positive electrode for a lithium secondary battery including the positive electrode active material, and a lithium secondary battery.

BACKGROUND ART

As technology development and demand for mobile devices have increased, the demand for secondary batteries as an energy source has been rapidly increased. Among such secondary batteries, lithium secondary batteries having high energy density and voltage, long cycle life, and low self-discharging rate have been commercialized and widely used.

As a positive electrode active material of a lithium secondary battery, a lithium transition metal oxide is used. Among such lithium transition metal oxides, a lithium-cobalt oxide, such as $LiCoO_2$, which has a high functional voltage and excellent capacity properties has been mainly used. However, $LiCoO_2$ has very poor in thermal properties due to the destabilization of a crystal structure according to de-lithium, and is also expensive. Therefore, $LiCoO_2$ has a limitation in being used as a power source in a field such as an electric vehicle or the like in a large amount.

As a material to replace $LiCoO_2$, a lithium transition metal oxide ($LiMO_2$; wherein M includes at least one of Ni, Co, or Mn) is being developed. The lithium transition metal oxide has a problem in that a transition metal is eluted due to HF formed by a reaction with an electrolyte solution during charge/discharge at a high temperature, and thus, performance is rapidly degraded.

Therefore, there is a demand for the development of a positive electrode active material which may manufacture a secondary battery having excellent high-temperature properties by suppressing a reaction between a lithium transition metal oxide and an electrolyte solution during high-temperature charge/discharge.

DISCLOSURE OF THE INVENTION

Technical Problem

In order to solve the above problem, a first aspect of the present invention provides a positive electrode active material which may solve the problem of energy density degradation during high-temperature charge/discharge.

A second aspect of the present invention provides a method for producing the positive electrode active material.

A third aspect of the present invention provides a positive electrode for a lithium secondary battery including the positive electrode active material.

A fourth aspect of the present invention provides a lithium secondary battery including the positive electrode.

Technical Solution

According to an aspect of the present invention, there is provided a positive electrode active material including a lithium transition metal oxide having a spinel crystal structure, and a coating layer positioned on the surface of the lithium transition metal oxide, wherein the coating layer has an orthorhombic structure, and includes an oxide represented by Formula 1 below.

$$Li_{2+x}Ni_{1-y}M1_yO_{2+z} \qquad \text{[Formula 1]}$$

In Formula 1 above, $0 \leq x \leq 0.2$, $0 \leq y \leq 0.5$, and $0 \leq z \leq 0.2$, and M1 includes one or more selected from the group consisting of Cu, Mg, Pt, Al, Co, P, and B.

According to another aspect of the present invention, there is provided a method for producing a positive electrode active material, the method including preparing a lithium transition metal oxide having a spinel crystal structure, and forming a coating layer, which has an orthorhombic structure and includes an oxide represented by Formula 1 above, on the surface of the lithium transition metal oxide in a wet manner.

According to another aspect of the present invention, there is provided a positive electrode for a lithium secondary battery including the positive electrode active material.

According to another aspect of the present invention, there is provided a lithium secondary battery including the positive electrode for a lithium secondary battery.

Advantageous Effects

According to the present invention, a coating layer having a specific structure is formed on the surface of a lithium transition metal oxide to easily suppress a reaction between the lithium transition metal oxide and an electrolyte solution during charge/discharge, thereby suppressing the elution of a transition metal from the lithium transition metal oxide, so that when applied to a battery, efficiency and capacity may be improved even when a high-temperature cycle is performed.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 illustrates the crystal structure of an oxide for forming a coating layer having an orthorhombic crystal structure, the oxide belonging to the Immm space group;

FIG. 2 is a view showing a diffusion path of lithium ions in an oxide for forming a coating layer having an orthorhombic structure, the oxide belonging to the Immm space group;

FIG. 3 is a view illustrating an X-Ray Diffraction (XRD) pattern of 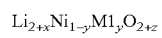 $Li_2Cu_{0.5}Ni_{0.5}O_2$ used as a material for forming a coating layer in Example 1;

FIG. 4 is a view illustrating an X-Ray Diffraction (XRD) pattern of $Li_2CuO_2$ used as a material for forming a coating layer in Comparative Example 1; and FIG. 5 is a view illustrating an X-Ray Diffraction (XRD) pattern of $Li_2NiO_2$ used as a material for forming a coating layer in Comparative Example 2.

BEST MODE FOR CARRYING OUT THE INVENTION

Hereinafter, the present invention will be described in more detail.

It will be understood that words or terms used in the specification and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

Positive Electrode Active Material

The present inventors have found that when a coating layer is formed on the surface of a lithium transition metal oxide by using a compound having a specific crystal structure and a formula, the coating layer is strongly adsorbed onto the surface of the lithium transition metal oxide, thereby stabilizing the surface structure of the lithium transition metal oxide, suppressing a side reaction between the lithium transition metal oxide and an electrolyte solution and the elution of a transition metal, and improving the diffusivity of lithium ions as well, and have completed the present invention.

Specifically, a positive electrode active material according to the present invention includes a lithium transition metal oxide having a spinel crystal structure, and a coating layer positioned on the surface of the lithium transition metal oxide, wherein the coating layer has an orthorhombic structure, and includes an oxide represented by Formula 1 below.

$$Li_{2+x}Ni_{1-y}M1_yO_{2+z} \quad \text{[Formula 1]}$$

In Formula 1 above, $0 \leq x \leq 0.2$, $0 \leq y \leq 0.5$, and $0 \leq z \leq 0.2$, and M1 includes one or more selected from the group consisting of Cu, Mg, Pt, Al, Co, P, and B.

Hereinafter, the positive electrode active material according to the present invention will be described in more detail.

First of all, a lithium transition metal oxide according to the present invention is a lithium transition metal oxide having a spinel-based structure.

Specifically, the lithium transition metal oxide may be a lithium-manganese-based oxide represented by Formula 2 below.

$$Li_{1+a1}Mn_{2-x1}M^2_{x1}O_{4-y1}A_{y1} \quad \text{[Formula 2]}$$

In Formula 2 above, $M^2$ includes one or more elements selected from the group consisting of Ni, Co, and Al, A includes one or more elements selected from the group consisting of F, Cl, Br, I, At, and S, and $0 \leq a1 \leq 0.2$, $0 \leq x1 \leq 0.5$, and $0 \leq y1 \leq 0.1$.

Specifically, in Formula 2 above, the A is an element substituted for an oxygen site in a lithium manganese oxide, and may be one or more elements selected from the group consisting of F, Cl, Br, I, At, and S.

Meanwhile, 1+a1 represents a molar ratio of lithium in the lithium manganese oxide, wherein a1 may satisfy $0 \leq a1 \leq 0.2$, more preferably $0 \leq a1 \leq 0.1$.

x1 represents a molar ratio of a doping element $M^2$ in the lithium manganese oxide, wherein the x1 may satisfy $0 \leq x1 \leq 0.5$, more preferably $0 \leq x1 \leq 0.3$. When the x1, the molar ratio of the $M^2$, satisfies the above range, a structurally stable positive electrode active material may be obtained while minimizing capacity degradation.

y1 represents a molar ratio of the A element in the lithium manganese oxide, wherein the y1 may satisfy $0 \leq y1 \leq 0.1$, more preferably $0 \leq y1 \leq 0.05$.

The lithium-manganese-based oxide represented by Formula 2 above has a spinel crystal structure, and thus, has a crystallographic distribution in which lithium ions and transition metal ions respectively occupy a 8a tetrahedral site and a 16d octahedral site. A spinel structure may implement high output properties since octahedrons sharing edges are connected three-dimensionally and provide a path for lithium movement during a charging and discharging process. In addition, the lithium-manganese-based oxide of Formula 2 above uses manganese, which is inexpensive, as a main raw material, and thus, has an advantage in that cost is low.

Meanwhile, the positive electrode active material of the present invention has an orthorhombic structure on the surface of the lithium transition metal oxide having a spinel crystal structure, and includes a coating layer having an oxide represented by Formula 1 below.

$$Li_{2+x}Ni_{1-y}M1_yO_{2+z} \quad \text{[Formula 1]}$$

In Formula 1 above, $0 \leq x \leq 0.2$, $0 \leq y \leq 0.5$, and $0 \leq z \leq 0.2$, and M1 includes one or more selected from the group consisting of Cu, Mg, Pt, Al, Co, P, and B.

Specifically, in Formula 1 above, the M1 is an element substituted for a Ni site in an oxide represented by Formula 1, and may include one or more selected from the group consisting of Cu, Mg, Pt, Al, Co, P, and B, preferably Cu.

y represents a molar ratio of a doping element M1 in the oxide represented by Formula 1 above, wherein the y may satisfy $0 < y \leq 0.5$, preferably $0.3 \leq y \leq 0.5$. When the y, the molar ratio of the M1, satisfies the above range, lithium mobility is improved, so that when applied to a battery, high-temperature cycle properties, capacity, and efficiency may be improved.

2+x represents a molar ratio of lithium in the oxide represented by Formula 1 above, wherein the x may satisfy $0 \leq x \leq 0.2$, preferably $0 \leq x \leq 0.1$.

2+z represents a molar ratio of oxygen of the oxide represented by Formula 1 above, wherein the z may satisfy $0 \leq z \leq 0.2$, preferably $0 \leq z \leq 0.1$.

When the oxide satisfying [Formula 1] above is used, that is, a lithium-nickel-based oxide in which some of nickel sites are doped with an M1 metal, compared to a case in which an oxide not satisfying [Formula 1] is used, such as a lithium nickel oxide (that is, $Li_2NiO_2$) not doped with the M1 metal, a lithium metal oxide (for example, $Li_2CuO_2$) not including nickel, or the like, excellent lithium ion diffusivity and structural stability may be implemented.

Particularly, the oxide represented by Formula 1 above may preferably be $Li_2Cu_{0.5}Ni_{0.5}O_2$.

Meanwhile, the oxide represented by Formula 1 above may have lattice parameters a, b, and c which may respectively satisfy 3.7 Å<a<3.8 Å, 2.6 Å<b<2.8 Å, and 9.0 Å<c<9.3 Å, and most preferably it may be that a=3.743 Å, b=2.779 Å, c=9.026 Å. The oxide having a crystal structure as described above may reversibly intercalate and de-intercalate lithium ions, and since the crystal structure has a three-dimensional layered structure, ion diffusion may rapidly occur.

In addition, the oxide represented by Formula 1 above may belong to the Immm space group. The Immm space group means a space group having three sides which are different in length and at right angles to each other. When the oxide represented by Formula 1 has the Immm space group, electrons of a lone electron pair of the M1 element may accelerate the movement of lithium ions, thereby further improving lithium diffusivity.

FIG. 1 illustrates the crystal structure of an oxide of [Formula 1] which belongs to the Immm space group, and FIG. 2 illustrates a diffusion path of lithium ions in the oxide of [Formula 1]. As illustrated in FIG. 1 and FIG. 2, the oxide of Formula 1 having an orthorhombic structure has Ni and M1 elements which share edges with oxygen, and thus, may easily diffuse lithium ions, and because of the planar structure thereof, lone election pairs remain above and below a plane, and these lone electron pairs help Li ions to move, so that the mobility of Li ions may be further improved.

As described above, since the oxide of Formula 1 above has a crystal structure which is advantageous in lithium ion diffusion, when the oxide is used to form a coating layer, a positive electrode active material having excellent lithium ion mobility may be obtained.

In addition, when the oxide of Formula 1 having an orthorhombic structure is coated on a lithium transition metal oxide of a spinel structure represented by Formula 2 above, a positive electrode active material having excellent structural stability may be obtained.

The oxide of Formula 1 having an orthorhombic structure and the lithium transition metal oxide of a spinel structure belong to the same crystal system, so that a solid solution may be easily formed. Therefore, when forming a coating layer, the oxide represented by Formula 1 is doped in the lithium transition metal oxide and forms a substituted solid solution, resulting in partially penetrating into lithium transition metal oxide particles. Accordingly, the coating layer is strongly bonded to the lithium transition metal oxide, and due to the presence of the coating layer described above, a side reaction with an electrolyte solution occurring on the surface of a positive electrode active material may be easily suppressed. In addition, the oxide represented by Formula 1 above is particularly stable in an available voltage range of a battery, for example, from 3.0 V to 4.5 V, and thus, may easily suppress a side reaction between a lithium transition metal oxide and an electrolyte solution.

In addition, the oxide of [Formula 1] above has a high oxygen formulation energy. Therefore, when the oxide of [Formula 1] above is coated on the surface of a lithium transition metal oxide, an effect of increasing the surface structural stability of the lithium transition metal oxide may be achieved.

According to the present invention, the above-described coating layer may have a thickness of 1 nm to 20 nm, preferably 1 nm to 10 nm, and more preferably 2 nm to 8 nm. As the above-described coating layer is formed to the above-described thickness range, a side reaction with an electrolyte solution may be easily suppressed without the degradation in properties of a lithium transition metal oxide.

Method for Producing Positive Electrode Active Material

Next, a method for producing a positive electrode active material according to the present invention will be described.

The method for producing a positive electrode active material of the present invention includes preparing a lithium transition metal oxide having a spinel crystal structure, and forming a coating layer, which has an orthorhombic structure and includes an oxide represented by Formula 1 below, on the surface of the lithium transition metal oxide in a wet manner.

$$Li_{2+x}Ni_{1-y}M1_yO_{2+z}$$ [Formula 1]

In Formula 1 above, $0 \leq x \leq 0.2$, $0 < y \leq 0.5$, and $0 \leq z \leq 0.2$, and M1 includes one or more selected from the group consisting of Cu, Mg, Pt, Al, Co, P, and B.

First, a lithium transition metal oxide of a spinel structure is prepared. At this time, the lithium transition metal oxide may be a lithium transition metal oxide represented by [Formula 2] described above.

Next, the lithium transition metal oxide is coated with the oxide having an orthorhombic structure and represented by Formula 1 in a wet manner to form a coating layer. Specifically, the coating may be performed by introducing the lithium transition metal oxide and the oxide represented by Formula 1 into a solvent, mixing the same by stirring, followed by removing the solvent, and then performing heat treatment.

At this time, the solvent may be, for example, N-methyl pyrrolidone and the like, and the mixing may be performed for 30 minutes to 3 hours.

Meanwhile, the lithium transition metal oxide and the oxide represented by Formula 1 may be mixed at a weight ratio of 100:1 to 100:10, preferably at a weight ratio of 100:2 to 100:8. When the mixing ratio of the lithium transition metal oxide and the oxide represented by Formula 1 satisfies the above range, a coating layer may be uniformly formed, so that a side reaction with an electrolyte solution may be effectively suppressed, and the degradation in physical properties of the lithium transition metal oxide may be minimized.

The removing of a solvent may be performed by filtering and drying processes.

Meanwhile, the heat treatment may be performed at a temperature of 200° C. to 600° C., preferably 300° C. to 600° C., and the duration of the heat treatment may be 1 to 10 hours, preferably 2 to 6 hours.

Typically, a coating layer has been typically formed on the surface of a lithium transition metal oxide in a dry manner, such as atomic layer deposition (ALD). However, in the case of dry coating, a coating film is non-uniformly formed in an island form, or a coating material is diffused into a lithium transition metal oxide, so that an effect of preventing contact with an electrolyte solution or an effect of suppressing the elution of a transition metal during high-temperature charge/discharge have not been sufficiently achieved. On the contrary, when a coating layer is formed on the surface of a lithium transition metal oxide in a dry manner as in the present invention, the coating layer is uniformly formed on the surface of the lithium transition metal oxide, so that a side reaction between the lithium transition metal oxide and an electrolyte solution may be easily suppressed even when charge/discharge is performed at a high temperature and the elution of a transition metal may be suppressed, and accordingly, when applied to high temperatures, battery properties may be improved.

Positive Electrode

In addition, the present invention provides a positive electrode for a lithium secondary battery, the positive electrode including a positive electrode active material produced by the method described above.

Specifically, the positive electrode includes a positive electrode current collector and a positive electrode active material layer formed on at least one surface of the positive electrode current collector and including the above-described positive electrode active material.

The positive electrode current collector is not particularly limited as long as it has conductivity without causing a chemical change in a battery. For example, stainless steel, aluminum, nickel, titanium, fired carbon, or aluminum or stainless steel that is surface-treated with one of carbon, nickel, titanium, silver, and the like may be used. Also, the positive electrode current collector may typically have a thickness of 3 to 500 µm, and microscopic irregularities may be formed on the surface of the current collector to improve the adhesion of a positive electrode active material. For example, the positive electrode current collector may be used in various forms such as a film, a sheet, a foil, a net, a porous body, a foam, and a non-woven body.

The positive electrode active material layer may include a conductive material and a binder, together with a positive electrode active material.

At this time, the positive electrode active material may be included in an amount of 80 to 99 wt %, more specifically 85 to 98 wt % based on the total weight of the positive electrode active material layer. When included in the above content range, excellent capacity properties may be exhibited.

At this time, the conductive material is used to impart conductivity to an electrode, and any conductive material may be used without particular limitation as long as it has electron conductivity without causing a chemical change in a battery to be constituted. Specific examples thereof may include graphite such as natural graphite or artificial graphite; a carbon-based material such as carbon black, acetylene black, Ketjen black, channel black, furnace black, lamp black, thermal black, and carbon fiber; metal powder or metal fiber of such as copper, nickel, aluminum, and silver; a conductive whisker such as a zinc oxide whisker and a potassium titanate whisker; a conductive metal oxide such as a titanium oxide; or a conductive polymer such as a polyphenylene derivative, and any one thereof or a mixture of two or more thereof may be used. The conductive material may be included in an amount of 1 to 30 wt % based on the total weight of the positive electrode active material layer.

The binder serves to improve the bonding between positive electrode active material particles and the adhesion between the positive electrode active material and the current collector. Specific examples thereof may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1 to 30 wt % based on the total weight of the positive electrode active material layer.

The positive electrode may be manufactured according to a typical method for manufacturing a positive electrode except that the positive electrode active material described above is used. Specifically, the positive electrode may be manufactured by applying a composition for forming a positive electrode active material layer, which is prepared by dissolving or dispersing the positive electrode active material described above and selectively, a binder and a conductive material in a solvent, on a positive electrode current collector, followed by drying and roll-pressing. At this time, the type and content of the positive electrode active material, the binder, and the conductive material are as described above.

The solvent may be a solvent commonly used in the art, and may be dimethyl sulfoxide (DMSO), isopropyl alcohol, N-methylpyrrolidone (NMP), acetone, water, or the like. Any one thereof or a mixture of two or more thereof may be used. The amount of the solvent to be used is sufficient if the solvent may dissolve and disperse the positive electrode active material, the binder, and the conductive material in consideration of the applying thickness of a slurry and preparation yield, and thereafter, have a viscosity which may exhibit excellent thickness uniformity during application for manufacturing a positive electrode.

In addition, in another method, the positive electrode may be manufactured by casting the composition for forming a positive electrode active material layer on a separate support and then laminating a film obtained by being peeled off from the support on a positive electrode current collector.

Lithium Secondary Battery

In addition, the present invention may manufacture an electrochemical device including the positive electrode. The electrochemical device may be specifically a battery, a capacitor, or the like, and more specifically, may be a lithium secondary battery.

Specifically, the lithium secondary battery includes a positive electrode, a negative electrode positioned to face the positive electrode, a separator interposed between the positive electrode and the negative electrode, and an electrolyte. The positive electrode is the same as that described above, and thus, a detailed description thereof will be omitted. Hereinafter, only the rest of the components will be described in detail.

Also, the lithium secondary battery may selectively further include a battery case for accommodating an electrode assembly composed of the positive electrode, the negative electrode, and the separator, and a sealing member for sealing the battery case.

In the lithium secondary battery, the negative electrode includes a negative electrode current collector and a negative electrode active material layer positioned on the negative electrode current collector.

The negative electrode current collector is not particularly limited as long as it has a high conductivity without causing a chemical change in a battery. For example, copper, stainless steel, aluminum, nickel, titanium, fired carbon, copper or stainless steel that is surface-treated with one of carbon, nickel, titanium, silver, and the like, an aluminum-cadmium alloy, and the like may be used. Also, the negative electrode current collector may typically have a thickness of 3 µm to 500 µm, and as in the case of the positive electrode current collector, microscopic irregularities may be formed on the surface of the negative electrode current collector to improve the adhesion of a negative electrode active material. For example, the negative electrode current collector may be used in various forms such as a film, a sheet, a foil, a net, a porous body, a foam, and a non-woven body.

The negative electrode active material layer selectively includes a binder and a conductive material in addition to a negative electrode active material.

As the negative electrode active material, a compound capable of reversible intercalation and de-intercalation of lithium may be used. Specific examples thereof may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, an Si alloy, an Sn alloy, or an Al alloy; a metal oxide which may be doped and undoped with lithium such as $SiO_\beta$ $(0<\beta<2)$, $SnO_2$, a vanadium oxide, and a lithium vanadium oxide; or a composite including the metallic compound and the carbonaceous material such as an Si—C composite or an Sn—C composite, and any one thereof or a mixture of two or more thereof may be used. Also, a metal lithium thin film may be used as the negative electrode active material. Furthermore, low crystalline carbon, high crystalline carbon and the like may all be used as a carbon material. Representative examples of the low crystalline carbon may include soft carbon and hard carbon, and representative examples of the high crystalline carbon may include irregular, planar, flaky, spherical, or fibrous natural graphite or artificial graphite, Kish graphite, pyrolytic carbon, mesophase pitch-based carbon fiber, meso-carbon microbeads, mesophase pitches, and high-temperature sintered carbon such as petroleum or coal tar pitch derived cokes.

The negative electrode active material may be included in an amount of 80 parts by weight to 99 parts by weight based on a total weight of 100 part by weight of a negative electrode active material layer.

The binder is a component for assisting in bonding between a conductive material, an active material, and a current collector, and is typically added in an amount of 0.1 parts by weight to 10 parts by weight based on a total weight of 100 parts by weight of a negative electrode active material layer. Examples of the binder may include polyvinylidene fluoride (PVDF), polyvinyl alcohol, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber, nitrile-butadiene rubber, fluorine rubber, various copolymers thereof, and the like.

The conductive material is a component for further improving the conductivity of a negative electrode active material, and may be added in an amount of 10 parts by weight or less, specifically 5 parts by weight, based on a total weight of 100 parts by weight of the negative electrode active material layer. The conductive material is not particularly limited as long as it has conductivity without causing a chemical change in the battery. For example, graphite such as natural graphite or artificial graphite; carbon black such as acetylene black, Ketjen black, channel black, furnace black, lamp black, and thermal black; conductive fiber such as carbon fiber and metal fiber; metal powder such as fluorocarbon powder, aluminum powder, and nickel powder; a conductive whisker such as zinc oxide and potassium titanate; a conductive metal oxide such as titanium oxide; or a conductive material such as a polyphenylene derivative, and the like may be used.

For example, the negative electrode active material layer may be prepared by applying a negative electrode mixture material, which is prepared by dissolving or dispersing a negative electrode active material and selectively a binder and a conductive material in a solvent, on a negative electrode current collector, followed by drying. Alternatively, the negative electrode active material layer may be prepared by casting the negative electrode mixture material on a separate support, and then laminating a film peeled off from the support on a negative electrode current collector.

The negative electrode active material layer may be prepared by, for example, applying a negative electrode mixture material, which is prepared by dissolving or dispersing a negative electrode active material and selectively a binder and a conductive material in a solvent, on a negative electrode current collector, followed by drying. Alternatively, the negative electrode active material layer may be prepared by casting the negative electrode mixture material on a separate support, and then laminating a film peeled off from the support on a negative electrode current collector.

Meanwhile, in the lithium secondary battery, a separator is to separate the negative electrode and the positive electrode and to provide a movement path for lithium ions. Any separator may be used without particular limitation as long as it is typically used as a separator in a lithium secondary battery. Particularly, a separator having high moisture-retention ability for an electrolyte as well as low resistance to the movement of electrolyte ions is preferable. Specifically, a porous polymer film, for example, a porous polymer film manufactured using a polyolefin-based polymer such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of glass fiber having a high melting point, polyethylene terephthalate fiber, or the like may be used. Also, a coated separator including a ceramic component or a polymer material may be used to secure heat resistance or mechanical strength, and may be selectively used in a single-layered or a multi-layered structure.

In addition, the electrolyte used in the present invention may be an organic liquid electrolyte, an inorganic liquid electrolyte, a solid polymer electrolyte, a gel-type polymer electrolyte, a solid inorganic electrolyte, a molten-type inorganic electrolyte, and the like, all of which may be used in the manufacturing of a lithium secondary battery, but is not limited thereto.

Specifically, the electrolyte may include an organic solvent and a lithium salt.

Any organic solvent may be used without particular limitation as long as it may serve as a medium through which ions involved in an electrochemical reaction of a battery may move. Specifically, as the organic solvent, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used. Among these solvents, a carbonate-based solvent is preferable, and a mixture of a cyclic carbonate (e.g., ethylene carbonate or propylene carbonate) having a high ionic conductivity and a high dielectric constant and a linear carbonate-based compound having a low viscosity (e.g., ethylmethyl carbonate, dimethyl carbonate, or diethyl carbonate), the mixture which may increase charging/discharging performance of a battery, is more preferable. In this case, the performance of the electrolyte solution may be excellent when the cyclic carbonate and the chain carbonate are mixed in a volume ratio of about 1:1 to about 1:9.

Any compound may be used as the lithium salt without particular limitation as long as it may provide lithium ions used in a lithium secondary battery. Specifically, as the lithium salt, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, or the like may be used. The lithium salt may be used in a concentration range of 0.1 M to 2.0 M. When the concentration of the lithium salt is in the above range, the electrolyte has suitable conductivity and viscosity, thereby exhibiting excellent performance, and lithium ions may effectively move.

In the electrolyte, in order to improve the lifespan properties of a battery, suppress the decrease in battery capacity, and improve the discharge capacity of the battery, one or more kinds of additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, and the like may be further included. At this time, the additive may be included in an amount of 0.1 to 5 parts by weight based on a total weight of 100 parts by weight of the electrolyte.

The lithium secondary battery including the positive electrode active material according to the present invention as describe above stably exhibits excellent discharging capacity, output properties, and lifespan properties, and thus, are useful for portable devices such as a mobile phone, a notebook computer, and a digital camera, and in the field of electric cars such as a hybrid electric vehicle (HEV).

Accordingly, according to another embodiment of the present invention, a battery module including the lithium secondary battery as a unit cell, and a battery pack including the same are provided.

The battery module or the battery pack may be used as a power source of one or more medium-and-large-sized devices, for example, a power tool, an electric car such as an electric vehicle (EV), a hybrid electric vehicle (HEV), and a plug-in hybrid electric vehicle (PHEV), or a power storage system.

The external shape of the lithium secondary battery of the present invention is not particularly limited, but may be a cylindrical shape using a can, a square shape, a pouch shape, a coin shape, or the like.

The lithium secondary battery according to the present invention may be used in a battery cell which is used as a power source for a small-sized device, and may also be preferably used as a unit cell for a medium- and large-sized battery module including a plurality of battery cells.

MODE FOR CARRYING OUT THE INVENTION

Hereinafter, the present invention will be described in detail with reference to embodiments. However, the embodiments according to the present invention may be modified into other various forms, and the scope of the present invention should not be construed as being limited to the embodiments described below. The embodiments of the present invention are provided to more fully describe the present invention to those skilled in the art.

Example 1

A transition metal hydrate $[Ni_{0.5}Cu_{0.5}](OH)_2$ was synthesized by a co-precipitation method. Specifically, nickel nitrate and copper nitrate were dissolved in water in a molar ratio of Ni:Cu of 1:1 to prepare a nitrate aqueous solution of 1.5 M. Next, while stirring the nitrate aqueous solution, 28% ammonia was dropped by 1 molar equivalent to adjust pH, and LiOH was added thereto by 2 molar equivalents to adjust a final pH to be 12. Next, the aqueous solution was stirred while being heat-treated for 3 hours at 50° C., and a precipitate was washed, and then recovered by centrifugation. Next, the precipitate was dried at 75° C., and then heat-treated for 6 hours at 450° C. in an air atmosphere. The heat-treatment product was mixed with $LiOH \cdot H_2O$, roll-pressed into a pellet form, and then heat-treated for 12 hours at 800° C. in an argon atmosphere to obtain oxide powder. In order to compensate for the loss of lithium at a high temperature, Li in 5% excess with respect to the oxide powder was added, and then the mixture was cooled in an argon atmosphere, transferred into a globe box filled with high-purity argon, and then pulverized in an argon atmosphere to obtain particulates represented by $Li_2Cu_{0.5}Ni_{0.5}O_2$.

Next, a lithium transition metal oxide of a spinel structure represented by $LiMn_2O_4$ and the $Li_2Ni_{0.5}Cu_{0.5}O_2$ powder (a material for forming a coating layer) obtained above were mixed at a weight ratio of 1:0.05 in N-methylpyrrolidone (NMP) for 1 hour, and then the mixture was heat-treated for 4 hours at 500° C. to produce a positive electrode active material in which a $Li_2Ni_{0.5}Cu_{0.5}O_2$ coating layer having a thickness of 5 nm was formed on the surface of the lithium transition metal oxide.

Comparative Example 1

A lithium transition metal oxide of a spinel structure represented by $LiMn_2O_4$ and $Li_2CuO_2$ powder (a material for forming a coating layer) were mixed at a weight ratio of 1:0.05 in NMP, which was a solvent, and then the mixture was heat-treated for hours at 500° C. to produce a positive electrode active material in which a $Li_2CuO_2$ coating layer having a thickness of 5 nm was formed on the surface of the lithium transition metal oxide.

Comparative Example 2

A lithium transition metal oxide of a spinel structure represented by $LiMn_2O_4$ and $Li_2NiO_2$ powder (a material for forming a coating layer) were mixed at a weight ratio of 1:0.05 in NMP, which was a solvent, and then the mixture was heat-treated for hours at 500° C. to produce a positive electrode active material in which a $Li_2NiO_2$ coating layer having a thickness of 5 nm was formed on the surface of the lithium transition metal oxide.

The positive electrode active material was produced in the same manner as in Example 1 except that $Li_2NiO_2$ was used. At this time, the thickness of the formed coating layer was 5 nm.

Experimental Example 1: X-Ray Diffraction (XRD) Pattern Measurement

An XRD measurement was performed using a Cu-Kα ray for the $Li_2Cu_{0.5}Ni_{0.5}O_2$ powder prepared in Example 1, the $Li_2CuO_2$ powder used in Comparative Example 1, and $Li_2NiO_2$ powder used in Comparative Example 2. The analysis results are shown in FIG. 3 to FIG. 5, respectively. Through FIG. 3 to FIG. 5, it can be confirmed that $Li_2Cu_{0.5}Ni_{0.5}O_2$, $Li_2CuO_2$, and $Li_2NiO_2$ all have an orthorhombic structure.

Experimental Example 2: Oxygen Formation Energy Measurement

The oxygen formation energy of each of the materials for forming a coating layer prepared by Example 1 and Comparative Examples 1 and 2 was confirmed. Specifically, using a Vienna Ab-initio simulation package (VASP) program, a density functional theory (DFT) calculation method was applied to calculate oxygen formation energy according to changes in crystal structure, and the calculation results are shown in Table 1 below. At this time, the oxygen formation energy was calculated under the following conditions, based on the DFT, and PBE functional PAW_PBE pseudopotential.

Hubbard U term for Ni=6.2 eV
Cut-off energy: 520 eV
Calculation model: A super cell with $Li_{48}$ (Ni and/or $Cu)_{24}O_{48}$ atoms
Oxygen vacancy ($V_O$) generation density=1/48 (~2.1 at. %), based on calculated values for $O_2$ gas (O-rich environment)

TABLE 1

| | Structure | Oxygen formation energy ($V_O$) (eV) |
|---|---|---|
| Example 1 | $Li_2 (Ni_{0.5}Cu_{0.5}) O_2$ (Immm) | 3.42 |
| Comparative Example 1 | $Li_2CuO_2$ (Immm) | 2.82 |
| Comparative Example 2 | $Li_2NiO_2$ (Immm) | 3.21 |

As shown in Table 1 above, it was confirmed that the oxygen formation energy of the material for forming a coating layer used in Example 1 was higher than that of the materials for forming a coating layer used in Comparative Examples 1 and 2. The oxygen formation energy is a calculated value to show which material needs more energy to remove one oxygen, and the higher the value, the more excellent the structural stability. Therefore, it can be assumed that the positive electrode active material of Example 1 including the $Li_2Ni_{0.5}Cu_{0.5}O_2$ coating layer may form a more stable structure against changes in structure due to the intercalation of lithium ions during charge/discharge than the positive electrode active material of Comparative Example 1 including the $Li_2CuO_2$ coating layer or the positive electrode active material of Comparative Example 2 including the $Li_2NiO_2$ coating layer.

Experimental Example 3 Lithium Diffusivity Measurement

The Li ion diffusivity of each of the materials for forming a coating layer used in Example 1 and Comparative Examples 1 and 2 was calculated using the Vienna Ab-initio simulation package (VASP) program, and the calculation results are shown in [Table 2].

The Li ion diffusivity was calculated under the following conditions, based on the Density Functional Theory (DFT), and PBE functional PAW_PBE pseudopotential.

Cut-off energy: 520 eV
Calculation model: A 4*4*1 hexagonal supercell with $Li_{96}Ni_{48}O_{96}$
Diffusivity calculation method: When lithium ions move to the nearest site, an energy barrier (Ea=0.4 eV) was calculated by a nudged elastic band (NEB) method, and then the calculated energy barrier was applied to an Arrhenius equation to calculate diffusivity $$D = a^2 v e^{-E_a/k_b T}$$ <Arrhenius equation>

In the above equation, a is the distance (2.31 Å) between lithium sites, and v is a hopping frequency, which is close to $1.0*10^{13}$ s$^{-1}$. T is 300 K, and Kb is a Boltzmann constant.

TABLE 2

| | Structure | Lithium ion diffusivity (cm²/s) |
|---|---|---|
| Example 1 | $Li_2 (Ni_{0.5}Cu_{0.5}) O_2$ (Immm) | $5.13*10^{-9}$ |
| Comparative Example 1 | $Li_2CuO_2$ (Immm) | $2.13*10^{-9}$ |
| Comparative Example 2 | $Li_2NiO_2$ (Immm) | $1.02*10^{-9}$ |

Through Table 2 above, it can be seen that $Li_2Ni_{0.5}Cu_{0.5}O_2$ used in Example 1 has a higher lithium ion diffusivity than $Li_2CuO_2$ used in Comparative Example 1 or $Li_2NiO_2$ used in Comparative Example 2. Therefore, it can be assumed that the positive electrode active material of Example 1 including the $Li_2Ni_{0.5}Cu_{0.5}O_2$ coating layer may have more excellent lithium ion diffusivity than the positive electrode active material of Comparative Example 1 including the $Li_2CuO_2$ coating layer or the positive electrode active material of Comparative Example 2 including the $Li_2NiO_2$ coating layer.

The invention claimed is:

1. A positive electrode active material comprising:
a lithium transition metal oxide having a spinel crystal structure; and
a coating layer positioned on a surface of the lithium transition metal oxide,
wherein the coating layer has an orthorhombic structure, and includes an oxide represented by Formula 1 below:

$$Li_{2+x}Ni_{1-y}M1_yO_{2+z}$$ [Formula 1]

wherein in Formula 1 above, 0≤x≤0.2, 0<y≤0.5, and 0≤z≤0.2, and M1 includes one or more selected from the group consisting of Cu, Mg, Pt, Al, Co, P, and B, and wherein
the oxide represented by Formula 1 belongs to an Immm space group.

2. The positive electrode active material of claim 1, wherein the coating layer has a thickness of 1 nm to 20 nm.

3. The positive electrode active material of claim 1, wherein, in the Formula 1, 0≤x≤0.1, 0.3≤y≤0.5, and 0≤z≤0.05.

4. The positive electrode active material of claim 1, wherein M1 comprises copper.

5. The positive electrode active material of claim 1, wherein the oxide represented by Formula 1 is $Li_2Cu_{0.5}Ni_{0.5}O_2$.

6. The positive electrode active material of claim 1, wherein the oxide represented by Formula 1 has lattice parameters of 3.7 Å<a<3.8 Å, 2.6 Å<b<2.8 Å, and 9.0 Å<c<9.3 Å.

7. The positive electrode active material of claim 1, wherein the lithium transition metal oxide is represented by Formula 2 below:

$$Li_{1+a1}Mn_{2-x1}M^2_{x1}O_{4-y1}A_{y1}$$ [Formula 2]

wherein in Formula 2 above, $M_2$ is one or more elements selected from the group consisting of Ni, Co, and Al, A is one or more elements selected from the group consisting of F, Cl, Br, I, At, and S, and $0 \leq a1 \leq 0.2$, $0 \leq x1 \leq 0.5$, and $0 \leq y1 \leq 0.1$.

8. A method for producing a positive electrode active material, the method comprising:
preparing a lithium transition metal oxide having a spinel crystal structure; and
forming a coating layer, which has an orthorhombic structure and includes an oxide represented by Formula 1 below, on a surface of the lithium transition metal oxide in a wet manner:

$$Li_{2+x}Ni_{1-y}M1_yO_{2+z} \quad \text{[Formula 1]}$$

wherein in Formula 1 above, $0 \leq x \leq 0.2$, $0 < y \leq 0.5$, and $0 \leq z \leq 0.2$, and M1 includes one or more selected from the group consisting of Cu, Mg, Pt, Al, Co, P, and B, and wherein the oxide represented by Formula 1 belongs to an Immm space group.

9. The method of claim 8, wherein the forming of the coating layer is performed by mixing the lithium transition metal oxide and the oxide represented by Formula 1 in a solvent, followed by removing the solvent and then performing heat-treatment.

10. The method of claim 9, wherein the lithium transition metal oxide and the oxide represented by Formula 1 are mixed at a weight ratio of 100:1 to 100:10.

11. The method of claim 9, wherein the heat-treatment is performed at a temperature of 200° C. to 600° C.

12. A positive electrode for a lithium secondary battery comprising the positive electrode active material of claim 1.

13. A lithium secondary battery comprising the positive electrode of claim 12.

* * * * *